March 24, 1931.         F. ROCHEFORT         1,798,033
INTERNAL COMBUSTION ENGINE
Filed Aug. 15, 1927
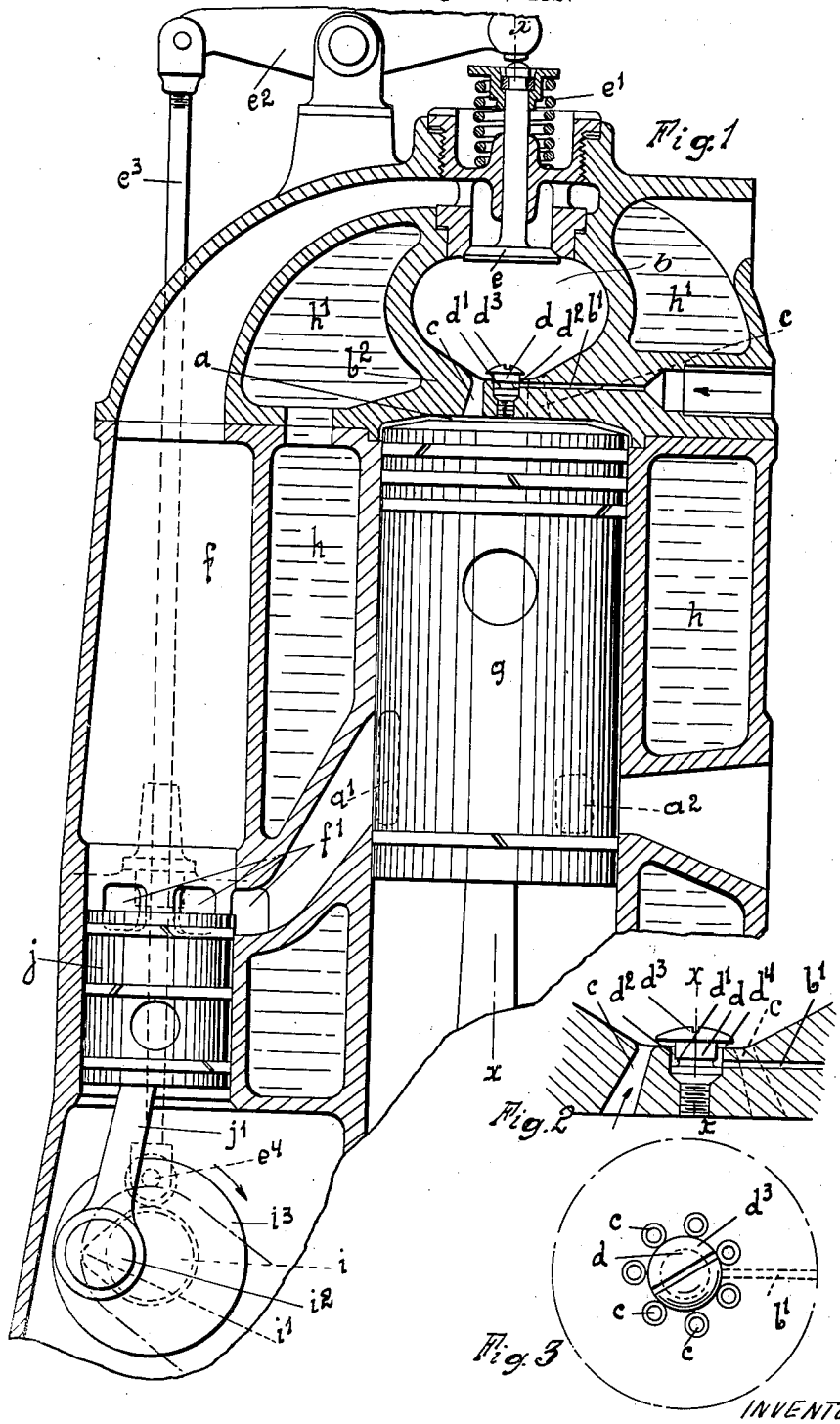
INVENTOR
Francois Rochefort Patented Mar. 24, 1931

1,798,033

UNITED STATES PATENT OFFICE

FRANÇOIS ROCHEFORT, OF PARIS, FRANCE

INTERNAL-COMBUSTION ENGINE

Application filed August 15, 1927, Serial No. 213,109, and in France August 31, 1926.

The present invention relates to internal combustion engines with spontaneous ignition of the charge by reason of the heat resulting from the compression of the air containing hydrocarbon vapours, as for example motors of the Diesel type.

In the Diesel cycle, combustion takes place at constant pressure during a fraction of the working stroke of the pistons; that cycle, which gives very good results in engines working at slow speed and with small variation in speed, is no longer suitable for light engines of high speed of rotation and large variations in speed.

Numerous attempts have been made to construct high speed engines with automatic ignition, employing the high compressions of the Diesel engine; experience has shown that it is not possible to maintain the constant pressure cycle for speeds of rotation of the order of 1200 or more revolutions per minute, under penalty of incomplete combustion due to the retarded injection of the fuel charge. This has led naturally to advancing the point of introduction of the fuel; the result is shown by an explosive combustion at constant volume, generally too violent for the piston, connecting rod and crankshaft mechanism of the engine.

Engines of this kind are even less flexible than the true Diesel engine; in practice, if the fuel injection be retarded, the combustion has no longer the time required for it to take place normally and completely; if the point of injection be advanced, the engine loses power and becomes very rough or jerky, and there is a risk of damage to its mechanical parts.

It has naturally occurred to those who have had to experiment with such engines, to divide the combustion chamber into two or more capacities, in such a way as to commence the combustion sooner by an advanced introduction of fuel into a chamber of small volume; the combustion is initiated in this preliminary combustion chamber, but cannot be completed by reason of the small volume of air contained therein; the rise of pressure due to the combustion of the gases expels the unburnt but atomized fuel either into the working cylinder in which the combustion is completed or into one or more other capacities and finally into the working cylinder itself.

By this arrangement, explosive shocks upon the working piston are indeed avoided, but owing to the division of the combustion it is no longer possible to obtain a suitable mean pressure on the engine piston.

In all these engines,
(1) It is very difficult to obtain a perfect atomization of the fuel and consequently a really homogeneous mixture of air and fuel;
(2) No attention has been given to the energetic scavenging of the burnt gases and of the residues contained in the one or more chambers or capacities of preliminary combustion, the excessive number of baffles rendering this scavenging impossible in the time available;
(3) By reason of the uneven distribution of the fuel, resulting from the inert gases contained in the one or more chambers of preliminary combustion, which gases prevent the formation of a homogeneous mixture, it is impossible to regulate as would be desirable the progressive combustion in these chambers and consequently the total combustion;
(4) The preliminary combustion is confined to a very small proportion of the combustible mixture; the result generally is an uneven diffusion of the unburnt fuel in the working cylinder; consequently there is a total absence of flexibility while irregularity is also noted in the operation of these engines.

The present invention has for object an internal combustion engine which is designed to avoid these inconveniences; it is characterized by this that an auxiliary chamber, in constant communication with the working cylinder through a series of twyers or nozzles, receives almost the whole of the volume of air admitted into the cylinder, this air carrying along and atomizing the charge of liquid fuel in the said chamber, wherein are produced the mixture, compression, spontaneous ignition and combustion of the charge, after which the burning gases act upon the engine piston by passing through the twyers or nozzles, of which the number, the angular setting and the sectional area are determined in such a way as to offer the minimum resistance to the flow of the gases and to obtain at the desired speed an expansive pressure as high as possible in the working cylinder whilst avoiding too high pressure on the engine piston at the moment of the spontaneous ignition.

The twyers or nozzles are, preferably Venturi-shaped and are uniformly spaced around a central annular liquid-fuel inlet (formed in the wall separating the auxiliary mixing, compression and combustion chamber from the working chamber of the engine cylinder), this inlet for liquid fuel being arranged in such a manner as to distribute gradually the charge of liquid fuel, coming from a distributor under pressure, into the mass of air being displaced from the cylinder into this auxiliary mixing, compression and combustion chamber, during the whole time of its flow through the nozzles.

This auxiliary chamber is furnished with a mechanically operated distribution device, for example a poppet valve or a slide valve, offering a large sectional area of passage for compressed air delivered at low pressure from a compressed air reservoir or manifold, in order to ensure the expulsion of the inert gases and of the residues of combustion away from the interior of this chamber.

This distribution device is operated in suitable relation with the control of the slide valve which distributes main scavening air to the engine cylinder, in the case of a two-stroke motor, and in relation with the operation of the inlet valve or other device performing the same function, in the case of a four-stroke motor.

The annexed drawing represents by way of example one arrangement for carrying out the invention in its application to a two-stroke motor.

Figure 1 is a view in axial vertical section through the engine cylinder with its auxiliary chamber for mixing, compression and combustion.

Figure 2 is a detail view on an enlarged scale of a modification of the device for admitting liquid fuel and Figure 3 is a corresponding plan view.

In the head of the engine cylinder $a$, there is formed an auxiliary chamber $b$ communicating with the interior of the cylinder by a series of convergent-divergent twyers or nozzles $c$, uniformly spaced around a central inlet for the liquid fuel which is forced under pressure by the distributor connected to a duct $b^1$ formed in the thickness of the wall $b^2$ of the auxiliary chamber $b$, between this latter and the working cylinder $a$ of the engine; this duct $b^1$ delivers into an axial opening in the wall $b^2$, into which is screwed a plug $d$. In line with the duct $b^1$, the body of the plug $d$ is provided with a circular groove $d^1$ receiving the liquid fuel; the latter rises as a vertical annular film or layer in the passage $d^2$, which is of very small cross section, being formed by the calibrated or accurately gauged clearance between the body of the plug $d$ and its seating, the exterior diameter of the plug $d$ being very slightly less than the interior diameter or bore of its seating.

In the arrangement shown in Figure 1, this thin layer of liquid fuel breaks against the flattened horizontal mushroom-shaped head $d^3$ of the plug $d$, this head extending in part above the orifices of the nozzles $c$ at a certain distance from the latter; the fuel is then carried along in the form of mist by the air passing through the nozzles $c$ as will be hereafter explained, eddies being caused under the mushroom head $d^3$. On the other hand, the nozzles $c$ are arranged parallel to the axis $x$—$x$ of the cylinder.

In the modification shown in Figures 2 and 3, the nozzles are oblique, that is to say, inclined to the axis $x$—$x$ of the cylinder, and they deliver into the auxiliary chamber $b$ at the level of the periphery of the mushroom head $d^3$ of the plug $d$; the gap $d^4$ between this head $d^3$ and the wall $b^2$, in which the nozzles are provided is very small, so that the vertical annular layer or film of fuel, rising through the passage $d^2$ of very small cross section between the plug-body $d$ and its seat, is spread out in a thin horizontal layer or film in the gap $d^4$ and brought into contact with the air escaping through the nozzles $c$, as will be hereafter explained; this air meets and breaks up the thin film of fuel and diffuses the liquid fuel in the chamber $b$.

This chamber $b$ is furnished at its upper part with a valve $e$ having a closing spring $e^1$, which valve is opened by means of a rocking lever $e^2$ by a rod $e^3$ mounted on a roller $e^4$ controlled by a cam $i'$ on a cam shaft $i^2$.

This valve $e$ provides a passage of large area for the admission into the chamber $b$ of low-pressure compressed air coming from a compressed air manifold $f$ fed by an auxiliary pump not shown; a distributor $j$, comprising a distributor slide valve connected to a timing crank shaft, driven by the engine shaft, controls the ports $f^1$ serving for the admission of this scavenging air into the chamber $b$, through the manifold $f$ and the valve $e$, and into the working cylinder $a$ through the ports $a^1$; these ports are closed by the engine piston $g$ during its ascending stroke a certain time after the piston has already closed the exhaust ports $a^2$.

The working of this engine is as follows:

The air admitted by the ports $a^1$ into the working cylinder $a$ after the scavenging period has ended, that is to say, after the piston $g$ has closed the exhaust ports $a^2$, is forced by the piston through the nozzles $c$ into the chamber $b$, carrying with it in its passage the liquid fuel supplied under pressure by the distributor; the liquid fuel thus atomized and diffused becomes suitably mixed with the air. The compression which takes place in the chamber $b$ furnishes the heat necessary for the vaporization and the gasification of the liquid fuel; the energetic stirring up or turbulence which takes place in the chamber ensures a very homogeneous mixture. This mixture ignites spontaneously in the chamber $b$ in which the combustion takes place entirely.

The head of the piston $g$ is preferably of a slightly dished or domed shape conforming with that of the cylinder head formed by the wall $b^2$, so that almost the whole of the fresh air admitted into the cylinder $a$ is forced by the piston $g$ into the chamber $b$. On the other hand, the walls of this chamber are suitably cooled by circulating water in a jacket $h^1$ which forms an upward continuation of the cylinder jacket $h$ so as to avoid any decomposition of the combustible mixture before its ignition.

The gases resulting from the combustion in the chamber $b$ pass through the nozzles $c$, which are so constructed as to offer a minimum resistance to the flow of the gases during this discharge from the auxiliary chamber $b$. The chamber $b$ serves for the compression, mixture, spontaneous ignition and combustion of the gases, and directs them towards the working cylinder $a$ in which the engine piston reciprocates and in which the expansion of these gases takes place. The number, the setting and the cross sectional area of these twyers or nozzles $c$ may be such that they permit of obtaining as high as possible a mean pressure in the engine cylinder and at the desired speed.

The movement of the distributor $j$ which controls the ports $f'$ is controlled by means of the connecting rod $j'$ on a crank pin $i^2$ carried by a crank disk $i^3$ fixed to the cam shaft $i$; the crank pin $i^2$ is set, relatively to the cam $i$ in such manner that the valve $e$ is controlled so as to open before the ports $f'$ are uncovered by the sliding distribution piston $j$. This causes the scavenging of the burnt gases to take place first in the auxiliary chamber $b$, by means of the air admitted past the valve $e$; when this chamber $b$ is full of clean air, the scavenging air is admitted through the ports $a^1$ into the engine cylinder $a$. The valve at the head of the chamber $b$ is closed shortly after the scavenging ports $a^1$ have been covered by the engine piston $g$.

In the engine according to this invention, such as has been described, it is possible as compared with the divided combustion engines above mentioned, having one or more chambers for preliminary combustion, better to regulate the quality and the homogeneity of the combustible mixture, thus permitting good carburation to be obtained.

The atomization of the liquid fuel becomes the more efficacious with increase of the duration of the flow of air forced by the piston into the auxiliary chamber. The combustion taking place at constant volume is more rapid, the temperature and the pressure are higher, the turbulence by reason of the homogeneity, the turbulence and the larger quantity of gas undergoing combustion. If the combustion is very rapid, there may be a violent explosion in the auxiliary chamber, but this explosion has no effect upon the moving parts (piston, connecting rod and crankshaft), the nozzles presenting sufficient resistance to the propagation of the explosive wave towards the engine cylinder. Moreover, if the whole of the fuel-charge cannot burn in the auxiliary compression, mixture and combustion chamber, the small quantity of unburnt fuel is energetically vaporized and diffused in the engine cylinder in which the combustion terminates.

The opening of the scavenging air admission valve arranged at the head of the auxiliary mixing chamber, immediately after the complete expansion of the burnt gases in the engine cylinder, has for effect to provoke a violent current of air which expels all the burnt gases and the residues of combustion from the auxiliary chamber.

The high speed of flow through the twyers or nozzles of the air passing from the cylinder into the chamber, and of the combustion gases passing from the chamber into the cylinder, prevents the obstruction or fouling of these twyers or nozzles by the residues of combustion. The general arrangement of the engine according to the invention has for effect to transfer from the working cylinder into the auxiliary compression mixture and combustion chamber, the high pressures and temperatures due to ignition and combustion; no inconveniences can result for this chamber, because there exist therein no mechanical moving parts.

The invention is applicable, not only to two-stroke engines, but also to four-stroke engines; the scavenging air for the mixture and combustion chamber is furnished by an auxiliary low pressure air pump or by suction, at the beginning of the admission stroke in this cylinder; in this last case, the valve for normal admission to the cylinder must open with a certain delay; the closings may be simultaneous.

What I claim is:

1. In an internal combustion engine, a body forming a working cylinder having a piston, and a combustion chamber separated from said working cylinder by a wall, said wall being provided with twyers forming the avenues of communication between said working cylinder and combustion chamber, said combustion chamber being substantially the entire compression space when the piston is at the top of its stroke, a fuel inlet for liquid fuel under pressure, opening through said wall into said compression chamber about which said twyers are grouped, forming passages for air displaced from said working cylinder upon compression stroke of said piston, and serving as passages for the combustion gases spontanenously ignited in said combustion chamber.

2. In an internal combustion engine as claimed in claim 1, the said twyers being Venturi-shaped.

3. In an internal combustion engine as claimed in claim 1, the said twyers being uniformly spaced about said fuel inlet.

4. In an internal combustion engine as claimed in claim 1, said fuel inlet comprising a plug fixed in said wall having a shank arranged in the fuel inlet conduit so as to form an annular passage through which the liquid fuel is admitted in a thin annular film, said plug having a head overlying said annular passage in slightly spaced relation thereto against which said film collides being thereby broken into the form of a mist, said plug being surrounded by said twyers, said fuel mist being entrained in the air being displaced upon the compression stroke of said piston and carried with said air into said combustion chamber.

5. In an internal combustion engine as claimed in claim 1, including a mechanically operated distribution device affording a large sectional area of exchange for compressed air delivered at low pressure from a suitable source of pressure for scavenging said combustion chamber.

6. In an internal combustion engine as claimed in claim 1, said fuel inlet device having a convex head, the twyers being Venturi-shaped and arranged about said fuel inlet with their axes inclined to the axis of said liquid fuel inlet device so that the air displaced from the working cylinder through said twyers into the combustion chamber leaves the twyers tangentially to the head of said fuel inlet device.

7. In an internal combustion engine as claimed in claim 1, the air distribution system to said working cylinder and combustion chamber being so arranged that the scavenging air is admitted to said combustion chamber prior to its admission to said working cylinder.

8. In an internal combustion engine as claimed in claim 1, the twyers being so designed that their capacity is such as to retard the passage of the combustion products at peak explosion pressure but to admit said combustion products with minimum retardation at working pressures below said peak pressure.

In testimony whereof I have signed my name to this specification.

FRANÇOIS ROCHEFORT.